W. R. ROGERS.
MACHINE FOR MAKING EDGING.
APPLICATION FILED AUG. 16, 1917.

1,267,595.

Patented May 28, 1918.
8 SHEETS—SHEET 1.

William R. Rogers
INVENTOR.
BY Wilson W. Hoover
ATTORNEY

WITNESS

W. R. ROGERS.
MACHINE FOR MAKING EDGING.
APPLICATION FILED AUG. 16, 1917.

1,267,595.

Patented May 28, 1918.
8 SHEETS—SHEET 3.

WITNESS

INVENTOR.
William R. Rogers.
BY
ATTORNEY

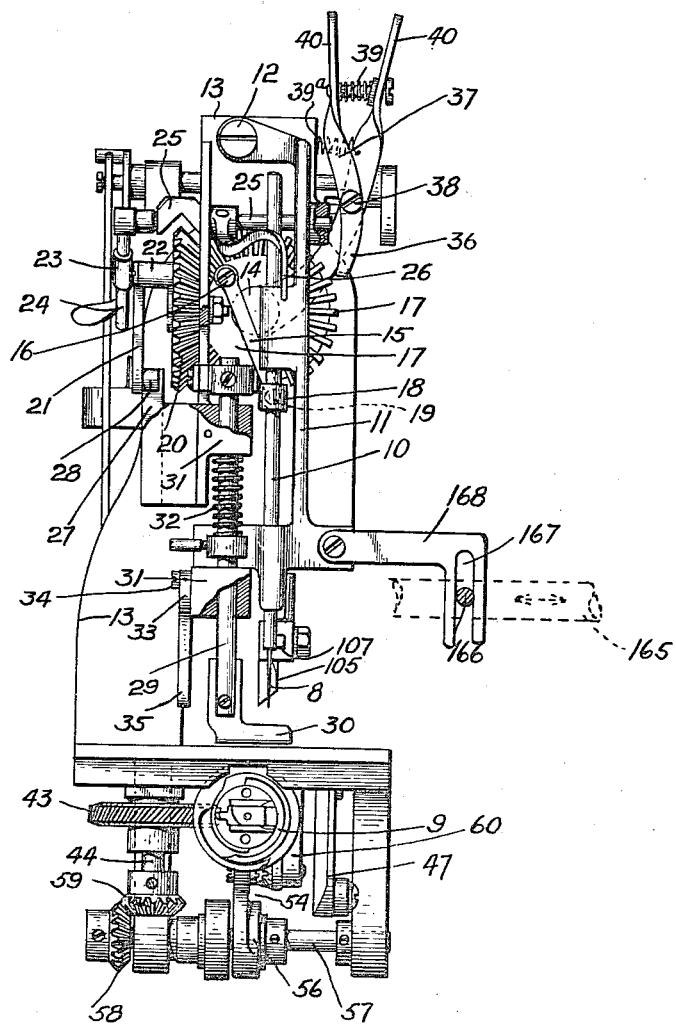

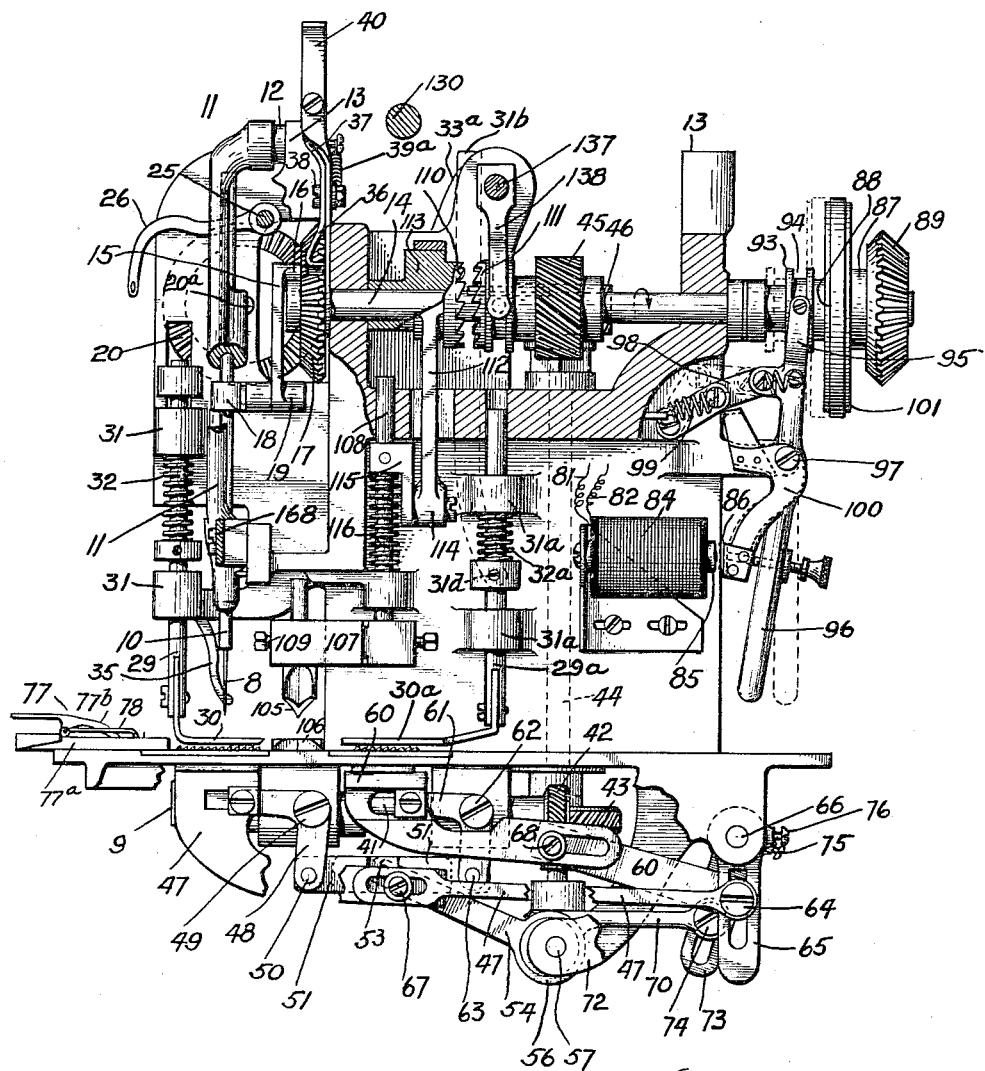

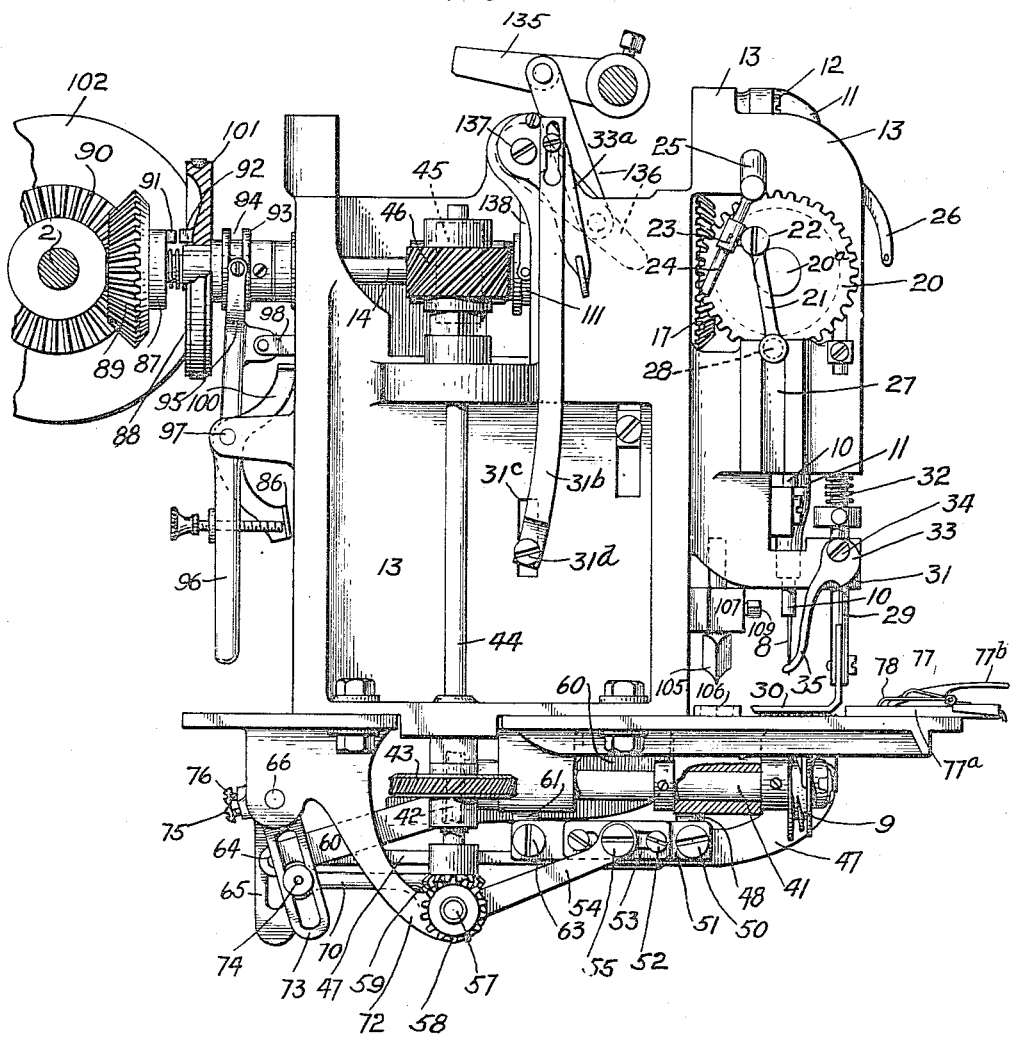

W. R. ROGERS.
MACHINE FOR MAKING EDGING.
APPLICATION FILED AUG. 16, 1917.

1,267,595.

Patented May 28, 1918.
8 SHEETS—SHEET 7.

WITNESS

William R. Rogers.
INVENTOR.

BY Wilson W. Hoover
ATTORNEY

W. R. ROGERS.
MACHINE FOR MAKING EDGING.
APPLICATION FILED AUG. 16, 1917.

1,267,595.

Patented May 28, 1918.
8 SHEETS—SHEET 8.

William R. Rogers
INVENTOR.

BY Wilson W. Hoover,
ATTORNEY

WITNESS

UNITED STATES PATENT OFFICE.

WILLIAM R. ROGERS, OF NEWARK, NEW JERSEY, ASSIGNOR TO WILLIAM RAUBITSCHEK, OF BROOKLYN, NEW YORK.

MACHINE FOR MAKING EDGING.

1,267,595.  Specification of Letters Patent.  Patented May 28, 1918.

Application filed August 16, 1917. Serial No. 186,509.

*To all whom it may concern:*

Be it known that I, WILLIAM R. ROGERS, a citizen of the United States, residing at the city of Newark, county of Essex, State of New Jersey, have invented a new and useful Improved Machine for Making Edging, of which the following is a specification.

My invention relates more particularly to that class of sewing machines adapted to produce a zig zag stitch and to automatic means for the multiple control of the lateral motions of the needle bars of a gang of machines, the units whereof may include twenty-five or thirty machines, also to a like control of the operation of the trimming mechanism of the respective units, as well as to means for throwing any unit of the gang into or out of engagement while the power shaft is revolving at normal operative speed.

Among other objects of my invention is to render the entire operation of the mechanism automatic and to thus reduce the labor cost and cheapen the product; also to provide automatic means for the disengagement of any unit when the supply of material is exhausted and to produce a trimmed edging at a single operation.

In my present invention I use the means substantially as shown in my copending applications for Letters Patent of the United States, for controlling the lateral motions of the needle bar, with the modification, that I provide for the multiple control of all of the needle bars of the gang of machines by a mechanism common to all of them, thus effecting a great economy in the cost of plant; such applications are for a machine for making scalloped edging, filed May 20, 1916, Serial No. 98,971, and for needle vibrating mechanism, filed July 28, 1916, Serial No. 111,788.

Having described some of the general features and objects of my invention I shall now more particularly describe the same by reference to the annexed drawing, in which similar reference characters indicate identical parts and which shows a machine embodying my invention.

In the drawing, Figure 1 is a side elevation of the main frame showing a front view of the mechanism for multiple control, with parts broken away and also a front view of several units of the gang of sewing machines with the transmission gear.

Fig. 5 is a detail perspective of the link system shown in Fig. 2.

Fig. 6 is a front elevation of one of the units of the gang of sewing machines.

Fig. 7 is a side elevation of the same, partly in section.

Fig. 8 is a similar view of the reverse side of the machine.

Figure 1:
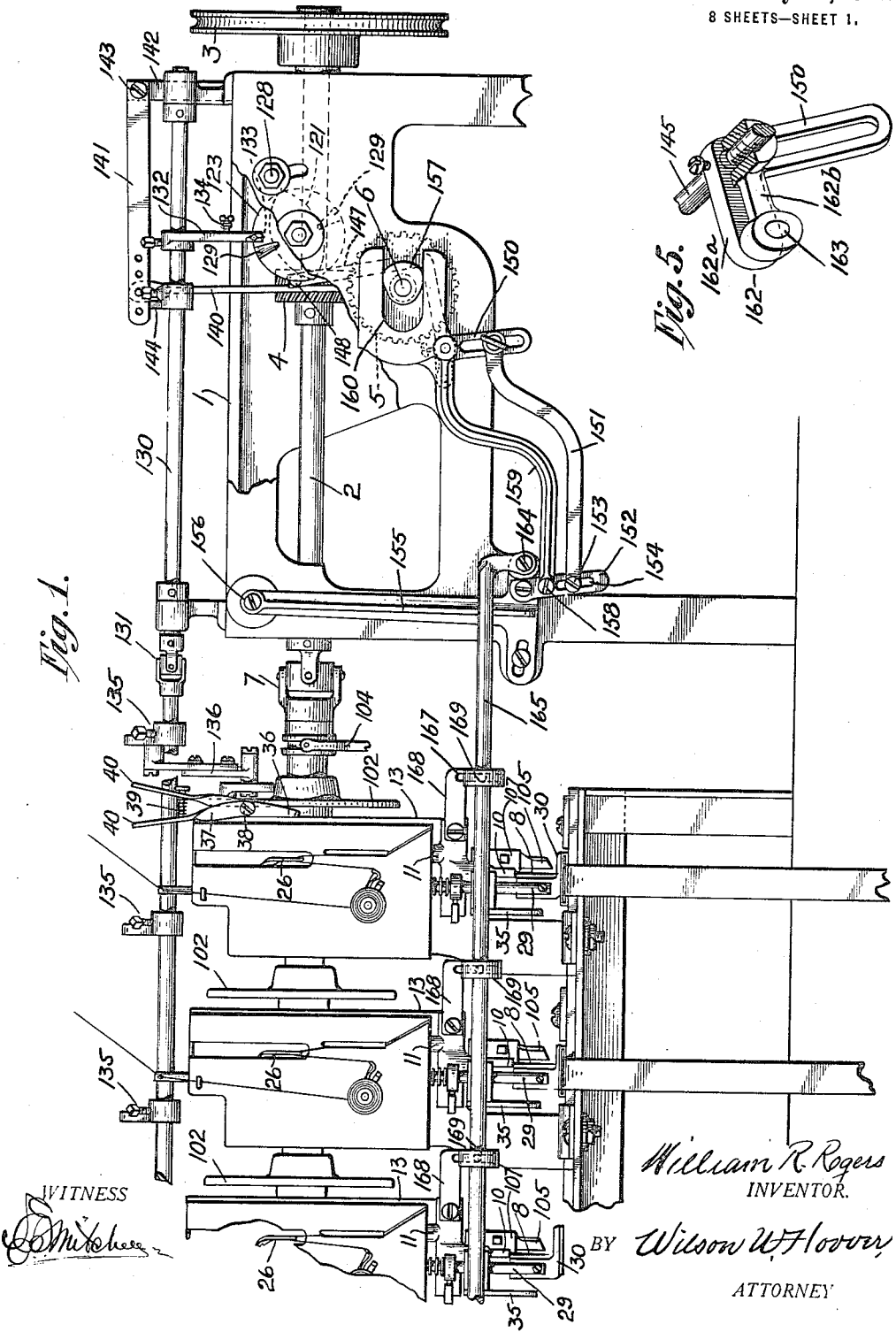

The main frame 1 carries the power shaft 2 which receives motion through its band pulley 3, from the source of power and is provided with a worm gear 4, which intermeshes with a corresponding gear 5, carried by the transverse shaft 6, journaled in the main frame 1 and rotates the transverse shaft 6, once for every two revolutions of the power shaft. The power shaft 2 is extended to connect with all of the units of the gang of machines, usually comprising from twenty five to thirty, which are severally thrown in and out of engagement therewith by the clutch mechanism hereinafter described. In order to permit of a variable alinement in the extension of the power shaft I provide a universal joint 7.

I shall first describe the individual machines and then the means for the multiple control of the lateral motions of the needle bars and of the cutting dies for trimming the selvage from the product.

The sewing machine shown in the drawing is of the usual type to produce a zig zag, lock stitch. The mechanism for vibrating the needle bar and for variably controlling the width of each successive stitch and its location on the material is common to all of the units of the gang of machines and will be hereafter described with the transmission gear.

I have added to the usual mechanism of this type of a machine, means for trimming the selvage from the product without interrupting the continuous progress of the material to operative position, or the stitching operation thereon and the trimming mechanism is the subject for my co-pending application for Letters Patent of the United States for selvage severing mechanism, filed July 28, 1916, Serial No. 111,790.

The stitch producing mechanism consists of a needle 8 and the usual looping device 9. The needle 8 is secured to the needle bar 10, mounted to reciprocate on the frame 11, which is fulcrumed at its upper end at 12, on the frame 13 of the sewing machine as shown.

By this arrangement the needle bar 8 can be vibrated laterally to the right or left, relatively to the line of advance of the material, from its vertical position or to both the right and left.

The needle bar 10 is normally vibrated to produce a zig zag stitch and the needle bar is reciprocated downwardly while in its deflected position, each time it is deflected by the vibrating mechanism, the stitches thus produced being at substantially a right angle to the line of direction of the advance of the material.

The needle bar shaft 14 reciprocates the needle bar 10 by means of the pitman 15, connected at 16 with the face of the beveled gear 17, carried on the front end of the needle bar shaft 14 and is pivoted to a bracket 18 on the needle bar 10, at 19 on its lower end.

The stitching mechanism includes the usual take up device, the arrangement being as follows: The beveled gear 17, carried on the end of the needle bar shaft 14, intermeshes with a corresponding gear 20, carried on a shaft 20$^a$, on the frame 13, on the rear of which gear is secured, by a crank pin 22, an angular crank arm 21; the angular extension of which is provided with a sleeve 23 in which is movably engaged the rock arm 24, carried by the rock shaft 25, mounted on the frame 13, as shown. The rock shaft 25 carries the take up arm 26, to which it imparts a timed reciprocal motion. The lower part of the crank arm 21 is mounted to reciprocate in the slot 27, a pin 28, carried by it, traveling therein as shown, the better to control the motion of the sleeve 23.

The foot bar 29, carrying the foot 30, is of the usual construction and mounted in the usual manner on the brackets 31 on the frame 13 of the machine. The foot bar is positioned by the spring 32 and is lifted out of engagement by the cam 33, secured to one of the brackets 31 on the frame of the machine, by the screw 34 and having a thumb piece 35. The rear foot bar 29$^a$ is of similar construction, having mounted thereon the foot 30$^a$ and carried on the brackets 31$^a$ on the frame of the machine. The foot bar 29$^a$ is positioned by the spring 32$^a$ and is lifted out of engagement by the cam 33$^a$, pivoted on the rock arm 137 and connected by the link 31$^b$ with the foot bar 29$^a$, through the slot 31$^c$, in the frame of the machine at 31$^d$ as shown in Fig. 8 and in dotted lines in Fig. 7.

As the machine is power operated and is liable to come to rest with the needle inserted in the material, I have added a device for manually rotating the needle bar, as may be necessary, to disengage the needle from the material; for this purpose I provide a pawl 36, secured to an arm 37, by the pin 38. The arm 37 is fulcrumed as shown in Fig. 6, on the needle bar shaft 14 and positioned by the spring 39$^a$. The arm 37 and pawl 36 are provided with the handles 40, positioned by the spring 39. The pawl 36 is thus adapted to operatively engage with the gear 17 and to rotate it step by step.

The looping device 9 is carried on the shaft 41, which is provided at its rear end with a worm gear 42, which intermeshes with a corresponding gear 43, carried on the lower end of the vertical shaft 44. The latter receives motion from the needle bar shaft 14, through the worm gear 46, carried on its upper end, which intermeshes with a corresponding gear 45, on the needle bar shaft.

The feed mechanism varies from the usual type, in that I supply a supplementary feed bar, located in the rear of the needle, to position the material, after the stitching operation, for the trimming operation.

The feed bar 47 is oscillated vertically, with timed intervals between each oscillatory movement, in the usual manner, by the angular rock lever 48, which is fulcrumed at its elbow at 49, on a bracket of the machine as shown and connected by the screw 50 with a link 51, which link is in turn connected by the screw 52, with the link 53 and the latter with the eccentric cam 54 by the screw 55. The arm 54 is carried by the eccentric 56, mounted on the transverse shaft 57, which receives motion from the vertical shaft 44, through the beveled gear 58, intermeshing with the corresponding gear 59, carried by the shaft 44.

The feed bar 60 is similarly oscillated vertically by the angular rock lever 61, fulcrumed at 62, on a bracket of the machine as shown and is connected by a set screw 63 with the link 51 above mentioned and thus also receives motion from the eccentric cam arm 54. The longitudinal motions are given to the respective feed bars, by which their longitudinal oscillatory movements alternate with their vertical motions as follows: The feed bar 47 is fulcrumed at 64 on a slotted rock arm 65, pivoted to the frame of the machine at 66. The feed bar 47 comprises two members, the rear member being slotted at its front end as shown and the front member is adjustably engaged therewith by the set screw 67, let through such slot as shown.

The feed bar 60 is similarly constructed of two members, the front member of which is slotted as shown, at its rear end, to receive the set screw 68 by which it is secured to the rear member and the feed bar 60 is fulcrumed at its rear end on the rock arm 65 by the set screw 64.

A longitudinal oscillatory motion is given to the feed bars 47 and 60 as follows: An eccentric cam 71, mounted on the transverse shaft 57, journaled in the brackets 72 of the machine, rocks the shaft 66 through the arm 73, with which it is connected at 74. The arm 73 is secured to the rock shaft 66 by the set screw 75. The rock arm 65 is secured to the shaft 66 by the set screw 76. Through the connection of the feed bars 47 and 60 with the rock arm 65 each oscillatory movement in either direction laterally alternates with an oscillatory vertical movement, whereby the feed bar is engaged with the material, advanced by a longitudinal motion, then is depressed, retracted and then raised to operative position in the usual manner.

Figure 11:
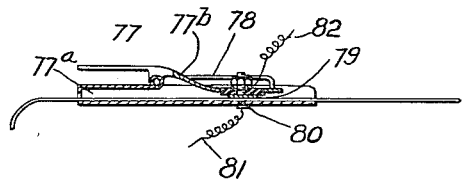
Fig. 11 is a detail of the guide and tension device for delivering the material to the machine.
Figure 12:
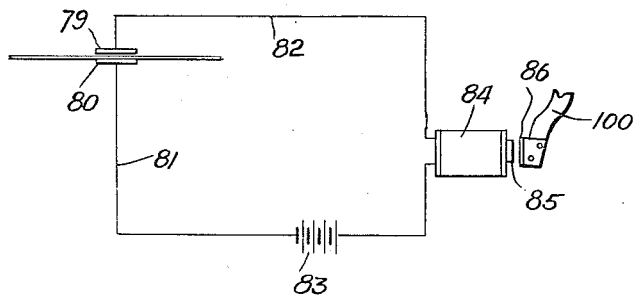
Fig. 12 is a diagrammatic sketch showing the electro-magnetic device for disengaging the machine when the supply of material fails.

A guide and tension device 77, is combined with automatic means for disengaging the machine from the power shaft 2 in the event that the supply of material is exhausted and the machine is running free; the arrangement is as follows: The guide 77 is attached to the front of the machine and consists of two members, the lower one or base 77ª, is provided with angular, turned up edges to act as a guideway and the upper one or presser plate 77ᵇ, is hinged to bear upon the base 77ª by a spring 78, shown in Fig. 7 and in the detail Fig. 11. The inner faces of the two members are faced or lined with leather fiber, or other suitable non conductor, through which contact points or electrodes 79 and 80 are normally positioned for contact, but are insulated from each other by the material supply engaged in the guide. These electrodes are in circuit with a low voltage electrical source, as a primary battery, and a magnetic coil, as illustrated in the diagrammatic sketch, Fig. 12, where 81 and 82 are the conductors, 83 the battery, 84 the magnetic coil, 85 the pole piece of the soft iron core, or electro-magnet and 86 is the armature. On the needle bar shaft 14 is mounted a geared clutch, consisting of two members 87 and 88. The member 87 is loosely mounted on the shaft 14 and is provided on its reverse face with a beveled gear 89, which intermeshes with a similar beveled gear 90 on the power shaft 2. The member 87 is provided on its face with a tooth 91. The member 88 is mounted on the shaft 14 for lateral motion thereon and rotates with the shaft and is provided on its face with a tooth 92 adapted to engage with the tooth 91, when the member 88 is advanced for that purpose. Secured to the member 88 on the reverse face thereof, is a collar 93, having a slot 94 in which is engaged a yoke 95 carried upon the upper end of an arm 96, fulcrumed at 97 on a bracket on the frame of the machine and is retained in operative position by a toggle joint 98. A tension spring 99 is secured at one end to the frame of the machine and at the other to the yoke 95, as shown in Fig. 7. Fulcrumed at 97 is a lever 100, carrying the armature 86 at its lower end and extending upward and normally in contact with the center of the toggle joint 98 when the clutch is engaged. When the electric circuit is closed the advance of the armature toward the pole piece presses the lever 100 against the toggle joint, throwing the latter off center and thus releases the clutch and disengages the machine from the power shaft.

I provide a frictional starting device so that a single machine may be thrown into engagement with the power shaft 2 while the latter is rotating at normal speed and avoid the stress arising from the sudden starting of the machine at full speed. I accomplish this as follows: The member 88 of the clutch is provided with a disk 101, faced with leather or other suitable substance on its periphery. The power shaft 2 carries a disk 102 which is of slightly greater diameter than the disk 101 and is normally held out of engagement with the latter by means of a spring 103. The member 102 carries a yoke arm 104 by which it can be advanced to engagement.

The mechanism for trimming the selvage from the edging consists of a cutting die 105 and a matrix 106, which corresponds to the pattern of the edging produced by the stitching mechanism, in contour, to the section thereof from which the die trims the selvage. The die is adapted to trim the selvage from a space equal to one pattern section at each operative engagement with the material. The die 105 is removably mounted on a cross head 107, carried on the lower end of the plunger shaft 108 as shown. The die is retained in place by the set screw 109 and the matrix is secured to the bedplate as indicated. The reciprocations of the plunger shaft 108 are so timed with the stitching mechanism that it is operatively reciprocated to trim the selvage from a pattern section, or a space equivalent to it, for each stitching operation on a corresponding pattern section.

This I accomplish by a geared clutch carried by the needle bar shaft 14 and which consists of two members 110 and 111. The part 111 is keyed to the needle bar shaft 14 and constantly rotated with it. The part 110 is loosely mounted on said shaft and has attached thereto an eccentric 113 carrying the arm 112, pivoted at 114 to a bracket 115 carried by the plunger shaft 108.

Figure 3:
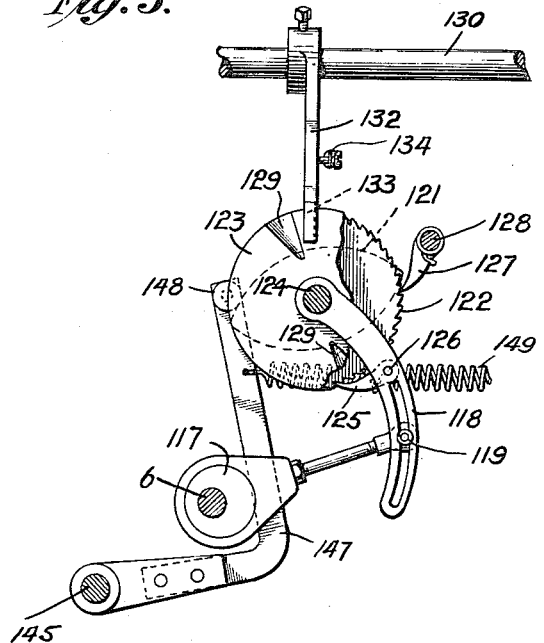
Fig. 3 is a cross section on line 3—3 of Fig. 2.

I provide a multiple control for the engagement and disengagement of the clutch mechanism of the trimming devices of the several machines, as well as a like control for the lateral motions of the needle bars of such machines. As the motions of the clutch and the lateral motions of the needle bar are related and the mechanism by which such multiple control is effected is also related, I shall describe them both together. The arrangement is as follows:

On the transverse shaft 6 is mounted an eccentric 117, adjustably secured to the rock arm 118 by the pin 119, as shown and indicated in Fig. 3. The arm 118 is pivoted to the stud 124 at 120. A rotary pattern cam 121, a ratchet wheel 122 and a recessed disk 123, are all secured together and mounted to rotate on the stud 124, carried by the main frame 1. The pattern cam 121 and with it the disk 123, receive motion through the engagement of the pawl 125, carried on the rock arm 118 and secured thereto by the pin 126, with the ratchet wheel 122, whereby a step feed is secured; the pattern cam being advanced one step for every revolution of the transverse shaft 6. A detent pawl 127, is carried on a stud 128, fastened to the main frame 1.

Figure 2:
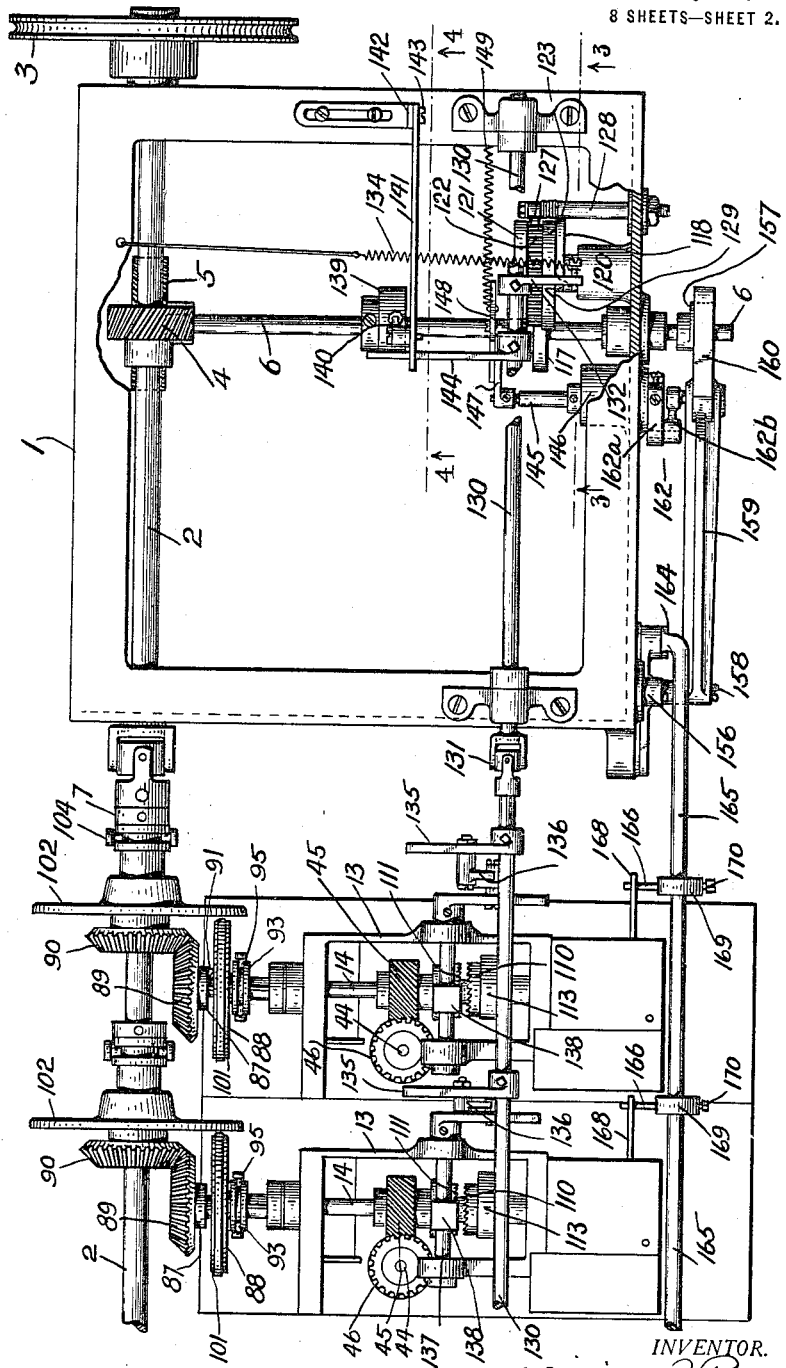
Fig. 2 is a plan view of the same.

The disk 123 has two V shaped recesses 129, the one diametrically opposite the other. The rock shaft 130 extends to all of the machines and is provided with a universal joint 131, as shown in Figs. 1 and 2. The rock shaft 130 carries the arm 132 which at its lower end is provided with a projecting tooth 133, which normally bears on the face of the disk 123, by means of the spring 134, one end of which is fastened to the arm 132 and the other to the frame 1 of the machine. When, in the course of rotation of the disk 123, one of the V shaped recesses 129, is advanced to alinement with the tooth 133, the latter engages therewith under the action of the spring 134 and rocks the shaft 130. Keyed to the rock shaft 130, for each sewing machine, is a lever 135, which operates, through a system of levers 136, a rock shaft 137, to which is attached the yoke arm 138, controlling the clutch member 111. Thus when the shaft 130 is rocked the plunger shaft 108 is operatively depressed.

Figure 4:
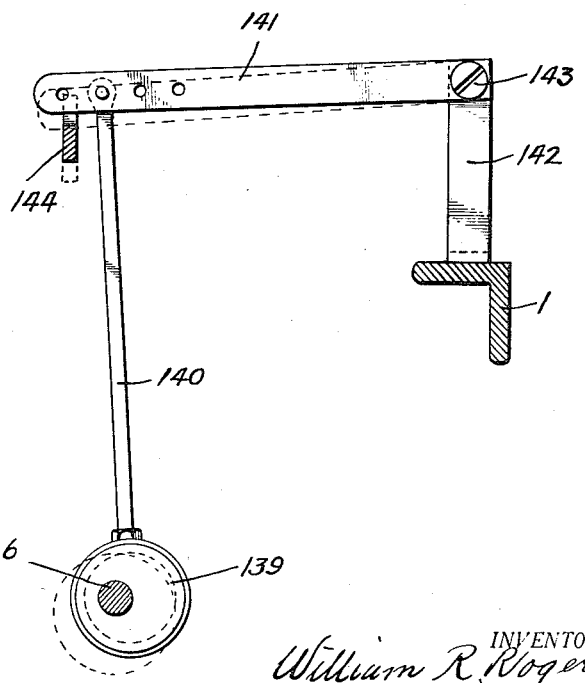
Fig. 4 is a cross section on line 4—4 of Fig. 2.
Figure 9:
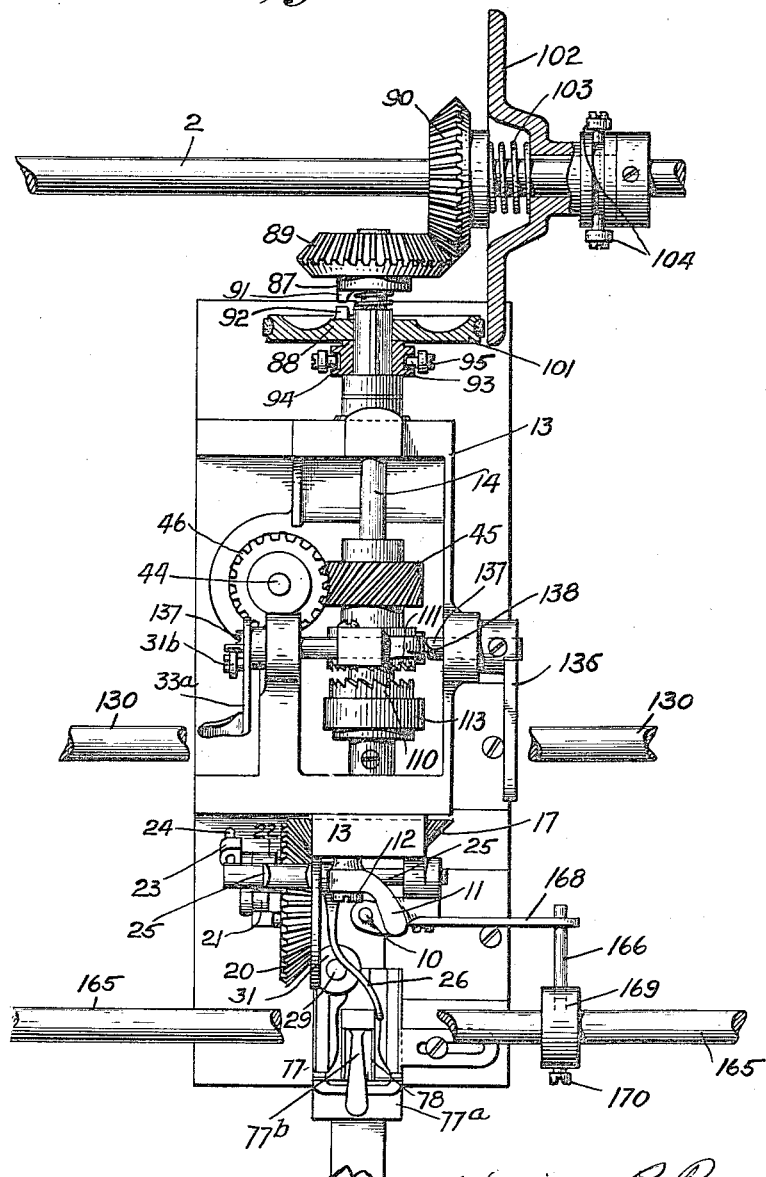
Fig. 9 is a plan view of the same.
Figure 10:
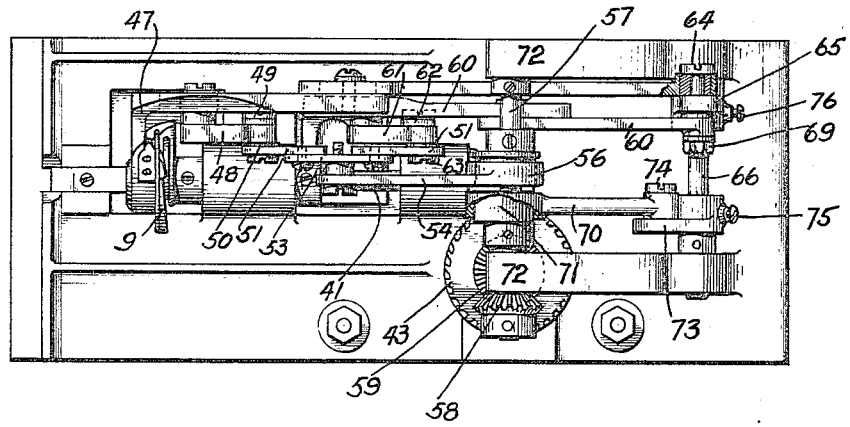
Fig. 10 is a bottom view of the same.

The disengagement of the clutch 110—111, is accomplished in the following manner:

On the shaft 6, shown in Fig. 4, is mounted an eccentric 139, the strap of which carries the rod 140, which is fastened to an arm 141, pivoted to the standard 142 on the frame 1, at 143. The rock shaft 130 carries an arm 144 fixed thereto, which projects under the finger 141. When the arm 132 has entered the slot or recess 129, in the disk 123, it has also rocked the arm 144 to the position shown in Fig. 4. Under the action of the eccentric 139 the arm or finger 141 is brought down into engagement with the upper edge of the arm 144, forcing it down into position as shown in the dotted lines, thereby restoring the rock arm 132 and its dependent parts to their normal position.

To a pintle 145, mounted in a bracket 146, on the main frame 1, of the machine, is secured, at its inner end, a rock arm 147, having a roller 148 on its outer end, which operatively bears on the periphery of the pattern cam 121, through the action of the spring 149, and travels thereon, receiving motion therefrom. At the outer end of the pintle 145 is secured the slotted arm 150, which takes motion from the pintle and gives motion to an arm 151, which at the other end is adjustably secured to a link 152 by a pin 153, let through a slot 154 in said link. The link 152 is pivoted on a rock arm 155, fulcrumed at 156 on the main frame 1. The outer end of the transverse shaft 6, carries an eccentric cam 157. Secured to a link 152, by a pin 158, is an arm 159, having a yoke 160 at its other end, which yoke is rocked by an eccentric 157. A link system 162, comprised of the links 162$^a$ and 162$^b$, connect the arm 159 with the pattern cam 121, as follows: To the pintle 145 is secured the link 162$^a$, which is an angular extension of the slotted arm 150 and at its outer end is pivoted to the link 162$^b$, by the pin 163; the other end of the link 162$^b$ is pivoted to the yoke arm 159. The rock arm 155 has secured thereto by a pin 164, a shaft 165, common to all of the sewing machines of the gang and at proper intervals is provided with a pin 166, which engages in the slot 167 of an angular bracket 168, carried by the needle bar frame 11 of the individual sewing machines and thus gives lateral motion to the respective needle bars. The pin 166 is carried on a sleeve 169, adjustably secured to the shaft 165 by a set screw 170.

The operation of the machine and of all the units thereof is automatic.

Having thus specified, shown and described the same, I claim as novel and my invention:

1. A number of sewing machines adapted for producing a zig zag stitch suitable for an edging, a power shaft common to all thereof, detachable connections engaging such machines with such power shaft, means for the automatic disengagement of any of such machines from such power shaft on failure of the material supply thereto and means for the multiple, variable control of the width and location on the material of the successive zig zag stitches.

2. A number of machines adapted to produce a zig zag stitch suitable for an edging and provided with means for trimming the product without interruption of the stitching operation, a power shaft, detachable means for engaging such machines with such power shaft, means for the automatic disengagement of any of such machines from such power shaft on failure of the supply of material thereto and means for the multiple control of such machines to vary the width and location on the material of the successive zig zag stitches to produce a series of pattern designs adapted for an edging.

3. A number of machines adapted to produce a zig zag stitch suitable for an edging, a power shaft common to all of the machines, detachable means for connecting any or all of such machines with such power shaft, means for the automatic disengagement of any of such machines from such power shaft on the failure of the supply of material thereto, such means including an electromagnetic control of a geared clutch engaging the machine with the power shaft and means for the multiple control of such machines to vary the width and location on the material of the successive zig zag stitches to produce a series of pattern designs adapted for an edging.

4. A number of machines adapted to produce a zig zag stitch suitable for an edging and provided with means for trimming the product without interruption of the stitching operation, a power shaft, detachable means for engaging such machines with the power shaft, a transmission shaft connected with the needle bar frames of all of the machines and means connected with shaft for the variable control of the lateral motions of the needle bars to vary the width and location on the material of the successive zig zag stitches.

5. A number of machines adapted to produce a zig zag stitch suitable for an edging and provided with means for trimming the product without interruption of the stitching operation, a power shaft, detachable means for engaging such machines with the power shaft, means common to all of the machines for the control of the lateral motions of the needle bars to vary the same to produce a series of pattern sections of a uniform design and a rock shaft connected with the trimming devices on the machines and with the means for the variable control of the lateral motions of the needle bars.

WILLIAM R. ROGERS.